(12) United States Patent
Bang-Andreasen

(10) Patent No.: US 10,199,808 B2
(45) Date of Patent: Feb. 5, 2019

(54) VARIABLE LENGTH OFFSHORE CABLE AND METHOD OF INSTALLATION

(71) Applicant: Seaproof Solutions AS, Nesttun (NO)

(72) Inventor: Henrik Bang-Andreasen, Bergen (NO)

(73) Assignee: Seaproof Solutions AS, Nesttun (NO)

( * ) Notice: Subject to any disclaimer, the term of this patent is extended or adjusted under 35 U.S.C. 154(b) by 0 days.

(21) Appl. No.: 15/743,283

(22) PCT Filed: Jun. 16, 2016

(86) PCT No.: PCT/EP2016/063856
§ 371 (c)(1),
(2) Date: Jan. 10, 2018

(87) PCT Pub. No.: WO2017/008988
PCT Pub. Date: Jan. 19, 2017

(65) Prior Publication Data
US 2018/0198264 A1    Jul. 12, 2018

Related U.S. Application Data

(60) Provisional application No. 62/192,906, filed on Jul. 15, 2015.

(51) Int. Cl.
*H02G 1/10* (2006.01)
*E02B 17/00* (2006.01)
*H02G 1/08* (2006.01)

(52) U.S. Cl.
CPC ........ *H02G 1/10* (2013.01); *E02B 2017/0095* (2013.01); *H02G 1/08* (2013.01)

(58) Field of Classification Search
CPC .......... H02G 1/10; H02G 9/02; H02G 15/046; H02G 1/08; H02G 3/04; E02B 2017/0095; F03D 13/25; F16L 11/18; F16L 1/12

See application file for complete search history.

(56) References Cited

U.S. PATENT DOCUMENTS 5,791,695 A * 8/1998 Snider ................... E21B 17/085
285/148.23
6,425,708 B1 * 7/2002 Siegfriedsen ............ H02G 1/10
405/154.1

(Continued)

FOREIGN PATENT DOCUMENTS

| EP | 0162543 | 11/1985 |
| WO | 00/39903 | 7/2000 |
| WO | 2015/071680 | 5/2015 |

OTHER PUBLICATIONS

Campbell-Smith, G., New Hang Off Connector at Windforce 2014, Jun. 16, 2014, Marine Technology News, all pages (Year: 2014).*

*Primary Examiner* — Carib A Oquendo
(74) *Attorney, Agent, or Firm* — Christian D. Abel

(57) ABSTRACT

The present invention provides an elongated, flexible conduit precut to an intended target length. Within the flexible conduit is arranged a cable. The elongated flexible conduit according to one aspect is a fiber-reinforced polymer conduit, and the conduit and cable are arranged to be hung-off and terminated at a first end to a first structure. The flexible conduit and internally-arranged cable are pre-cut and pre-terminated to a predetermined target length, whereby, under expected cable-laying conditions, a first or primary hang-off collar at a second end of the conduit will optimally reach the hang-off interface at a second installation such as, for example a hang-off interface arranged in a corresponding deck at a second Monopile foundation. The second end of the flexible conduit comprises a primary, or a main, hang-off interface collar arranged at an intended forecast length. However, to provide for a margin of error, the second end also comprises one or more preinstalled extension segments, each having its own hang-off collar.

8 Claims, 10 Drawing Sheets

(56) References Cited

U.S. PATENT DOCUMENTS

| | | | |
|---|---|---|---|
| 6,848,862 B1 | 2/2005 | Schlig | |
| 2010/0054862 A1* | 3/2010 | Brown | E21B 17/017 |
| | | | 405/169 |
| 2010/0294504 A1* | 11/2010 | Wajnikonis | E21B 17/015 |
| | | | 166/345 |
| 2011/0226527 A1* | 9/2011 | Ritchie-Bland | F16L 1/123 |
| | | | 174/669 |
| 2011/0308809 A1* | 12/2011 | Holtet | E21B 17/021 |
| | | | 166/345 |
| 2012/0037377 A1* | 2/2012 | Walker | E21B 17/01 |
| | | | 166/345 |
| 2013/0092386 A1* | 4/2013 | Gilmore | E21B 19/004 |
| | | | 166/345 |
| 2014/0037384 A1* | 2/2014 | Moeller | F16L 1/235 |
| | | | 405/158 |
| 2014/0246232 A1* | 9/2014 | Wyatt | H02G 1/10 |
| | | | 174/75 D |
| 2014/0255102 A1* | 9/2014 | Bang-Andresen | H02G 1/10 |
| | | | 405/158 |
| 2015/0162730 A1 | 6/2015 | Silva | |
| 2017/0346264 A1* | 11/2017 | Wilson | H02G 1/10 |

\* cited by examiner

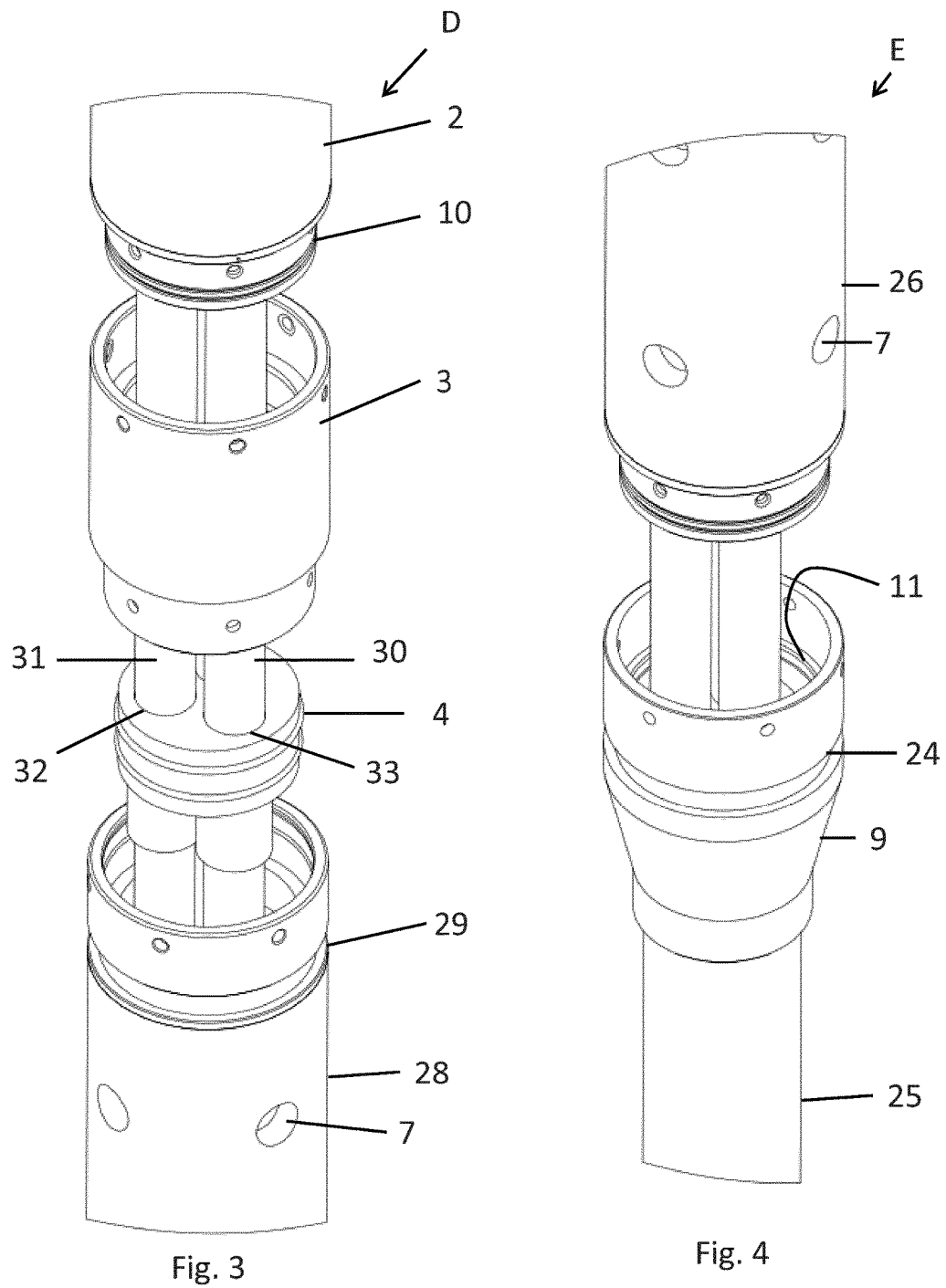

VARIABLE LENGTH OFFSHORE CABLE AND METHOD OF INSTALLATION

FIELD OF THE INVENTION

The present invention relates offshore cables, more particularly for inter-array cables in offshore energy parks and other offshore installations.

BACKGROUND

In many offshore installations, an offshore cable is connected to a hang-off interface above the surface of the water at the installation. A non-limiting example of this is a cable raised to a hang-off interface inside an offshore Monopile, such as found in wind turbines in an offshore energy park, as well as floating foundations. Such cables are often run from one Monopile/Wind Turbine foundation to another along the seabed.

There are essentially two methods for running a cable between two installations. The cable can either be connected to the first installation and then spooled out to the second installation, where the cable is cut to appropriate length and a termination device/hang-off flange installed on site to the cut end of the cable. This is a very labour intensive and costly operation, however. Alternatively, the cable may be pre-cut. In the latter situation, the cable can either be of the correct length, or more commonly either too short or too long. The drawbacks of the different situations, i.e. cable cut on site and pre-cut of the cable onshore, are described in more detail in the following, starting with the situation where the cable is cut on site.

Cutting the cable require the end of cable to be sealed off before it can be pulled into the foundation/installation thru the seawater. Then the cable ends must be equipped with cable protection which requires deck space on the cable installation vessel (designated cable lay-vessel or vessel or barge equipped with cable storage and handling equipment. Such work impacts the vessel and marine operation for many hours. A typical cable installation campaign has daily costs exceeding €100.000. In situations where the cable is too long, it is typically connected to the first installation and then spooled out to the second installation, where the cable is cut to the appropriate length and a termination device/hang-off flange installed on site to the cut end of the cable. This is a very labour intensive and costly operation, however. After the cable is pulled in and hung-off in a temporary hang-off arrangement it is common routine that the termination of the cable commences, as a separate offshore campaign offshore. This work requires multiple days of offshore work within the foundation, typical figure is three (3) days for a competent offshore termination crew adding costs of a dedicated personal transfer vessel, the offshore personal and WOW (waiting-on-weather) contingency may run above €100.000 per cable end).

The alternative, i.e. in situations where the cable is prepared on shore, it is usual to prepare a pre-cut pre-terminated cable of predetermined length on shore, and deliver the pre-cut cable to the site. The costly labour of cutting and terminating the cable on site offshore is thus avoided. In practice, however, it has proven to be very difficult to correctly estimate the correct length of such pre-cut/pre-terminated cables. The uneven surface of the seabed, unexpected geological formations and other factors very often result in the cable being either too long or too short. In the event the cable is too long, it may have to be cut and re-terminated at the site, thereby destroying the cost-savings of having pre-cut the cable on shore. Alternatively, the cable may be laid in different routing which if laid in a curve- or snaked (=multiple curves in stead of straight lay) potentially could solve the overlength issue. But this requires other measures in post-lay burial operations and adds unnecessary material costs to the cable.

In the event the cable is too short it is not fit for purpose and may, for example simply be discarded on the seabed, and a new cable must be prepared. This is obviously an extremely inconvenient and costly necessity.

The present invention provides a solution to the drawbacks identified above.

SUMMARY OF THE INVENTION

The solution according to the present invention renders possible connection in situations when a pre-terminated cable arrangement that is precut to a target length is found to be too short or too long during pull-in and hang-off between two offshore foundations/structures.

The present invention provides an elongated, flexible conduit precut to an intended target length. As used herein, the term "target length" means the optimal length of the conduit required to traverse the calculated distance, under expected laying conditions, from the hang-off interface of a first installation to the hang-off interface of a second installation. Within the flexible conduit is arranged a cable. The elongated flexible conduit according to one aspect is a fibre-reinforced polymer conduit. Examples of such conduits include flexible tubes of a polymeric material, with strength elements (load carrying fibres of textiles, aramides, carbon fibres or steel) or composites of polymers and fibres, and flexible hoses with bend-stiffeners or bend-restrictors in both polymeric materials and steels.

According to one aspect the conduit is water tight.

According to one aspect, the conduit is single elongated unit, or comprised of a plurality of co joined segments, including two or more segments, depending on the demand in the specific project. The segments can for instance be extension segments.

At the first end of the flexible conduit is arranged a termination body with a permanent mechanical termination for the stress/load carrying components of the cable. This first end of the conduit is connected to the hang-off interface at the first installation, e.g. a Monopile or Turbine foundation. Such hang-off interfaces in the case of offshore Monopiles are typically arranged in the floor of a deck (often referred to as hang-off deck) inside the Monopile above the surface of the water, often referred to as "hang-off-deck" or "airtight-deck" for hanging off cables. As used herein, the term "hang-off interface" refers to the arrangement at the installation from which a conduit is suspended. The structure on the conduit that cooperates with the hang-off interface is referred to herein as a hang-off collar. Such arrangements are known in the art for hang-off interfaces. In situations of noxious gases present below the deck, the deck may provide an air tight seal against the area below the deck. Therefore, the cable and flexible conduit at the first end comprise air and water tight seals to prevent water and gasses from entering the area above the deck through the flexible conduit/cable. The seals are advantageously in place initially such as to avoid potential problems, for instance with gases and or liquid intrusion as discussed above, in case one cannot open the segment at the hang-off and install the seal. In other situations, when noxious gases is not present below the deck, e.g. in jacket installations or floating foundations, the deck does not need to be air-tight, and a watertight seal may provide for the desired sealing.

Once the conduit is engaged with the hang-off interface, the ends of the cable (which can be, for example electrical or optical cables) can be connected to their respective terminals above the deck by means known in the art.

The flexible conduit and internally-arranged cable are pre-cut and pre-terminated to a predetermined target length, whereby, under expected cable-laying conditions, a first or "primary" hang-off collar at the second end of the conduit will optimally reach the hang-off interface at a second installation (such as, for example a hang-off interface arranged in a corresponding deck at a second Monopile foundation). The flexible conduit may cover the full length of the cable or, alternatively, only a part of the cable length, i.e. not the full cable length. The second end of the flexible conduit comprises a primary, or a main, hang-off interface collar arranged at an intended forecast length. However, to provide for a margin of error, the second end also comprises one or more preinstalled extension segments, each having its own hang-off collar, e.g. a first, second, third hang-off collar and so on. The extension segments are arranged such that, in the event the predetermined length is accurate, the primary hang-off collar is used, with the extension segments projecting upwards from the hang-off interface at the deck within the interior of the foundation. With the cable hung off inside the foundation, the pre-terminated segment is opened and the components making up the cable are routed to the respective terminals: High Voltage (HV) components to the Switchgear and the Fibre Optical bundle to the patch panel.

The hang-off interface may comprise various arrangements for engaging a hang-off collar of the conduit. The hang-off interface is capable of supporting the combined weights of the cable and flexible conduit from the foundation hang-off interface.

If the predetermined length of the conduit from the first installation to the primary hang-off collar is too long, the cables can be routed through to their respective terminals, and any excess cable length can stowed appropriately within the foundation.

In the event the predetermined length to the primary hang-off collar is too short, the conduit can be coupled to the hang-off interface by the hang-off collar of one of the extension segments. The hang-off interface may be a flange, or alternatively, it may be made up of two half-circles which when they are place in a groove of the collar makes a flange. The principle of hang-off interfaces made up of half-circles closing around the cable or flexible conduit forming one or more extension segments of the cable, is generally known in the art. But, in a specific embodiment of the hang-off interface, the hang-off collar on the cable or flexible conduit comprise an external groove extending around the whole circular circumference of the cable/flexible conduit. The half-circles then have a complementary projection on the radial inside, to fit with the groove in the collar on the cable/flexible conduit. After arranging the half-circles around the groove, they are fixed in place by e.g. screws or other suitable means known to the person skilled in the art.

Similar to the situation when the forecasted length was too long, the pre-terminated segments are opened and the respective cable components connectors are routed to a terminal. This may be utilized by providing a J-box for the jumpers, where J-box and jumpers compensates for the missing length of cable.

According to one aspect, the extension segments (i.e. the flexible conduits) are ventilated by providing ventilation openings along a part or whole of the length of the extension segments. This is advantageous because the electrical conductors produce heat when under load. It is therefore preferred that the temperature of the cable inside the flexible conduit is kept under critical temperature. If the temperature is above critical temperature, it is a risk of the cable starting to so-called "run-off"—also referred to as "hot spot" where the resistivity of the cable increases and leading to additional temperature increase (resistivity is proportional with temperature increase). Thus, if the cable heats up due to resistance in the cable, this resistance also increase due to the temperature rise, such that higher resistance again produces more heat, which increases the resistance and so on. Especial at high loads (ampacity) the ventilation supports passive convection along each individual ventilated length.

According to one aspect, water tight and air tight seals may be provided at each hang-off collar. Any of the hang-off collars may be used, allowing the seals at the hang-off collars to isolate the air columns below and above the air tight deck as, or if, required.

According to an aspect, each of the air tight segments seals off the air around each individual component inside the cable. Prior to the installation of the hang-off interfaces in the air tight deck, water- and airflow between the ventilated segments are allowed by the ventilation holes in each segment, but not inside the inventive hang-off interfaces. For cables with a common waterproof barrier (e.g. extruded polymer jacket) the seal may be accommodated on this outer barrier by means of a boot-seal or moulded waterproof joint. However, such seal will be prone to surface pin-hole(s) when handled and preferably seals are applied to each component barrier inside the cable. Having the seals on the inside of protective abrasion and preferably under the armouring layer of the cable protects the seal(s) against pin holes.

According to one aspect of the invention the seal is a seal plate having O-ring seals to the hang-off housing and the seal plate is made so each cable component pass thru a separate aperture within the seal plate. Each cable component is sealed with a boot seal on the lower side of the seal plate. Fluid and air tight boot seal to each component within the cable seals off all component within the cable at the seal plate.

The air seal/water seal may in an embodiment be provided with O-ring grooves, e.g. one, two, or a plurality of O-ring grooves to seal against a male lower connector of the first segment. The first, second and any additional segment, may have male and female connectors with one or more O-ring seal between them.

According to an aspect, the interface to the pre-terminated segment forms a watertight barrier. The watertight barrier may be required to keep the pre-terminated parts of the cable and or flexible conduit dry when it is exposed to elements and/or pulled through water.

According to an aspect, the air-tight seal is made as a boot seal facilitating individual seal to:
 each individually jacketed cable (conductors, fibre-bundles etc.), or
 externally to seal against the inside wall of the hang-off.

The invention presented facilitates an elongation length to be incorporated in the pre-terminated (=pre-determined length) cable thus allowing the cable to be installed—also when the pre-determined cable is found to be too short when the second end is to be pulled in and hung of in its foundation/structure.

In order to allow a certain "margin" of variable cable length below the projected cable length the following invention will allow the cable length to be fixed in its forecasted length in its pre-determined hang-off position.

At this cable length the inventions elongated length—made up of the combined length of the first segment and the second segment is not required and hence tower on top of the hang-off interface where the hang-off interface is secured.

BRIEF DESCRIPTION OF THE DRAWINGS

FIG. 3 is a detailed view of area D on FIG. 1B;

FIG. 4 is a detailed view of area E on FIG. 1B;

DETAILED DESCRIPTION

Figure 1A:
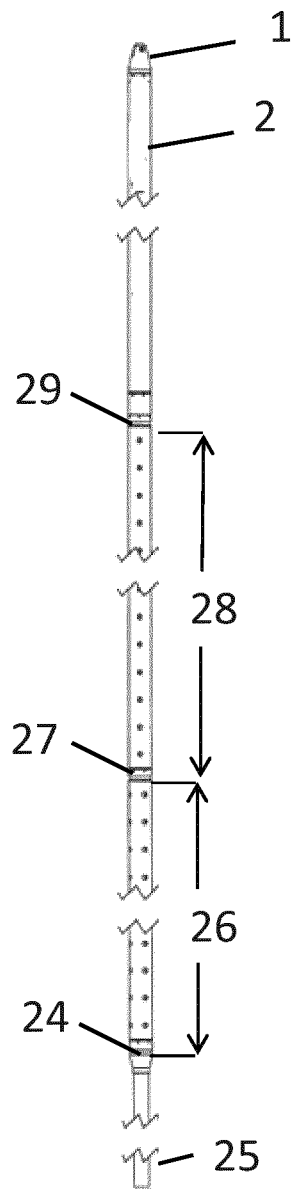
FIGS. 1A and 1B show an overview of a flexible conduit according to the present invention connected to a cable.

FIG. 1A shows an example of an end of a cable arrangement according to the invention. A primary or main hang-off collar 24 is arranged at the end of a conduit 25 surrounding an internal cable. The main or primary hang-off collar 24 corresponds to the forecast length of the conduit 25. The conduit 25 extends e.g. to another installation (not shown).

A first extension segment 26 extends forward from primary hang-off collar 24, and ends at a first supplemental hang-off collar 27. A second extension segment 28 extends forward from segment 26, and ends in a second supplemental hang-off collar 29. The arrangement is terminated by pre-terminated array 2 comprising a pull nose 1 at its leading end. While two extension segments are shown, any appropriate number of segments may be utilized.

Figure 1B:
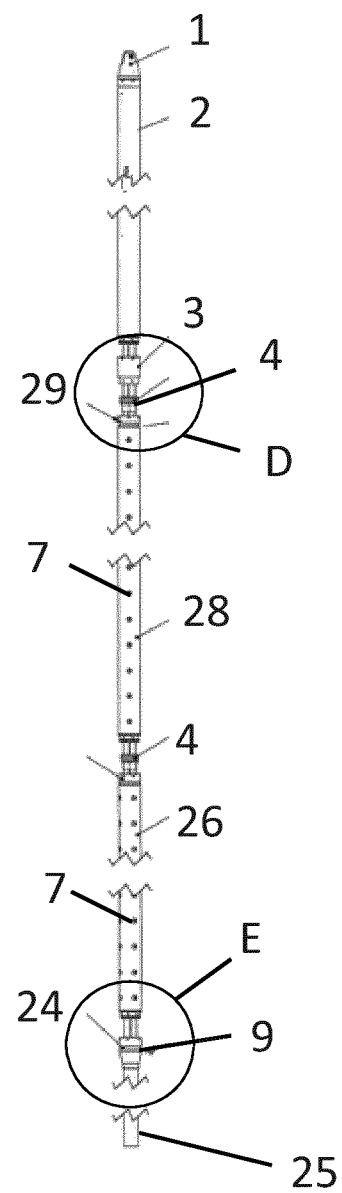

FIG. 1B shows an exploded view of the conduit in FIG. 1A, where details of the connections between the different segments and hang-off collars are shown in more detail.

FIGS. 1B and 3 shows a watertight seal housing 3 and air seal/water seal 4 are arranged between the pre-terminated array 2 and extension segment 28, above second supplemental hang-off collar 29. Further, the extension segment 28 has ventilation openings (e.g. holes) 7.

Similarly, there is arranged air seal/water seal 4 between the extension segment 28 and the first hang off collar 27 and between the extension segment 26 and the main hang-off collar 24, respectively. The extension segment 26 has ventilation openings 7.

Each of the air tight segments seals off the air around each individual component inside the cable. Prior to the installation of the hang-off interfaces in the air tight deck, water- and airflow between the first and second extension segments 26, 28 are allowed by the ventilation holes 7 in each segments 26, 28, but not inside the hang-off collars 24, 27, 29.

Figure 2:
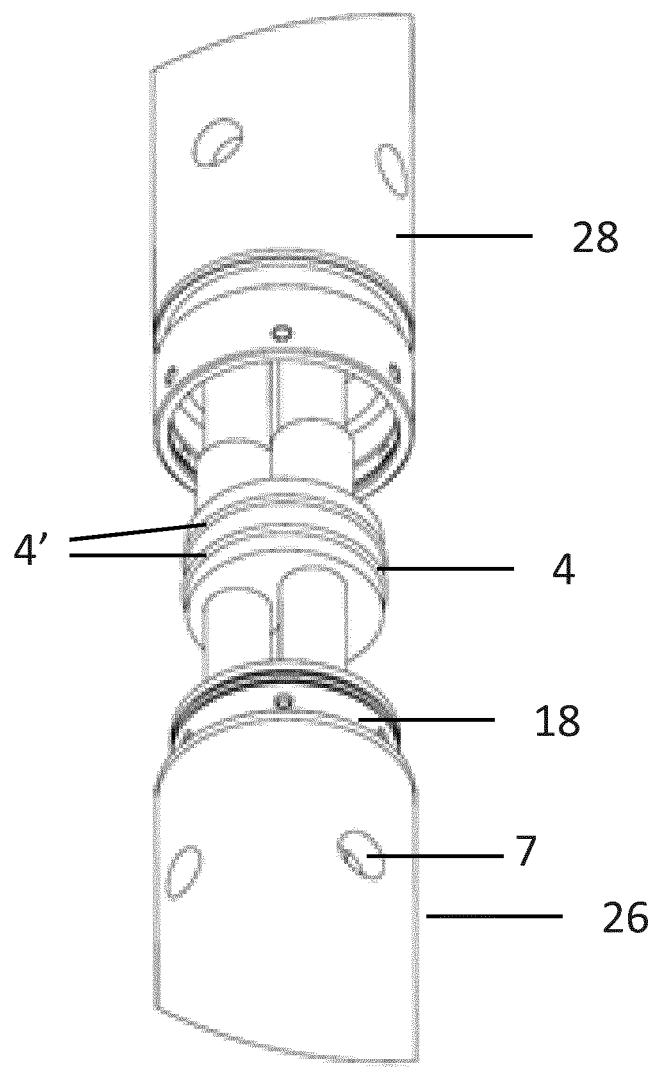
FIG. 2 shows an exploded view of a connection between the first and second segments of the flexible conduit.

FIG. 2 shows an exploded view of a connection between the first and second segments 26, 28. The air seal/water seal 4 with two-o ring grooves 4' seal against the male lower connector 18 of the first segment 26. The first and second segments 26, 28 have male and female connectors with o-ring seal between them.

FIG. 3 is a detailed view of area D on FIG. 1B and shows the second hang-off collar 29, the air seal/water seal 4, the watertight seal housing 3, the ventilation openings 7 in the extension segment 28 and a sealed interface 10 of the pre-terminated array 2. The air-tight seal is made as a boot seal facilitating individual seal to each individually jacketed cable (conductors, fibre-bundles etc.), externally to seal against the inside wall of the hang-off. For cables with a common waterproof barrier (e.g. extruded polymer jacket) the waterproof seal 3 may be accommodated on this outer barrier by means of a boot-seal or moulded waterproof joint. However, such waterproof seal 3 will be prone to surface pin-hole(s) when handled and preferably seals are applied to each component barrier inside the cable. Having the seals on the inside of protective abrasion and preferably under the armouring layer of the cable protects the seal(s) against pin holes.

According to one aspect of the invention the air seal/waterproof seal 4 may in the form of a seal plate, having o-ring seals 11 to a conical termination housing 9 as shown in FIG. 4 or to seal housing 3 as shown in FIG. 3 and the seal plate made so each cable component 30, 31 pass through a separate aperture 32,33 within the seal plate, respectively. Each cable component is sealed with a boot seal on the lower side of the seal plate. Fluid and air tight boot seal to each cable component within the cable seals off all components within the cable at the seal plate.

FIG. 4 is a detailed view of area E on FIG. 2 and shows the main hang-off collar 24 at the end of the flexible conduit 25. The cable within conduit 25 is fitted with mechanical termination of its stress members, e.g. by layers of steel armour—or other type of load bearing member. The extension segment 26 and the extension segment 28 are designed to work as mechanical strength member of the cable in absent of the cable stress member. In FIG. 4, the mechanical termination is shown as a conical termination housing 9 of the cable stress members using wire-lock termination solution to fix the armour of the cable in the main hang-off collar 24.

Figure 5:
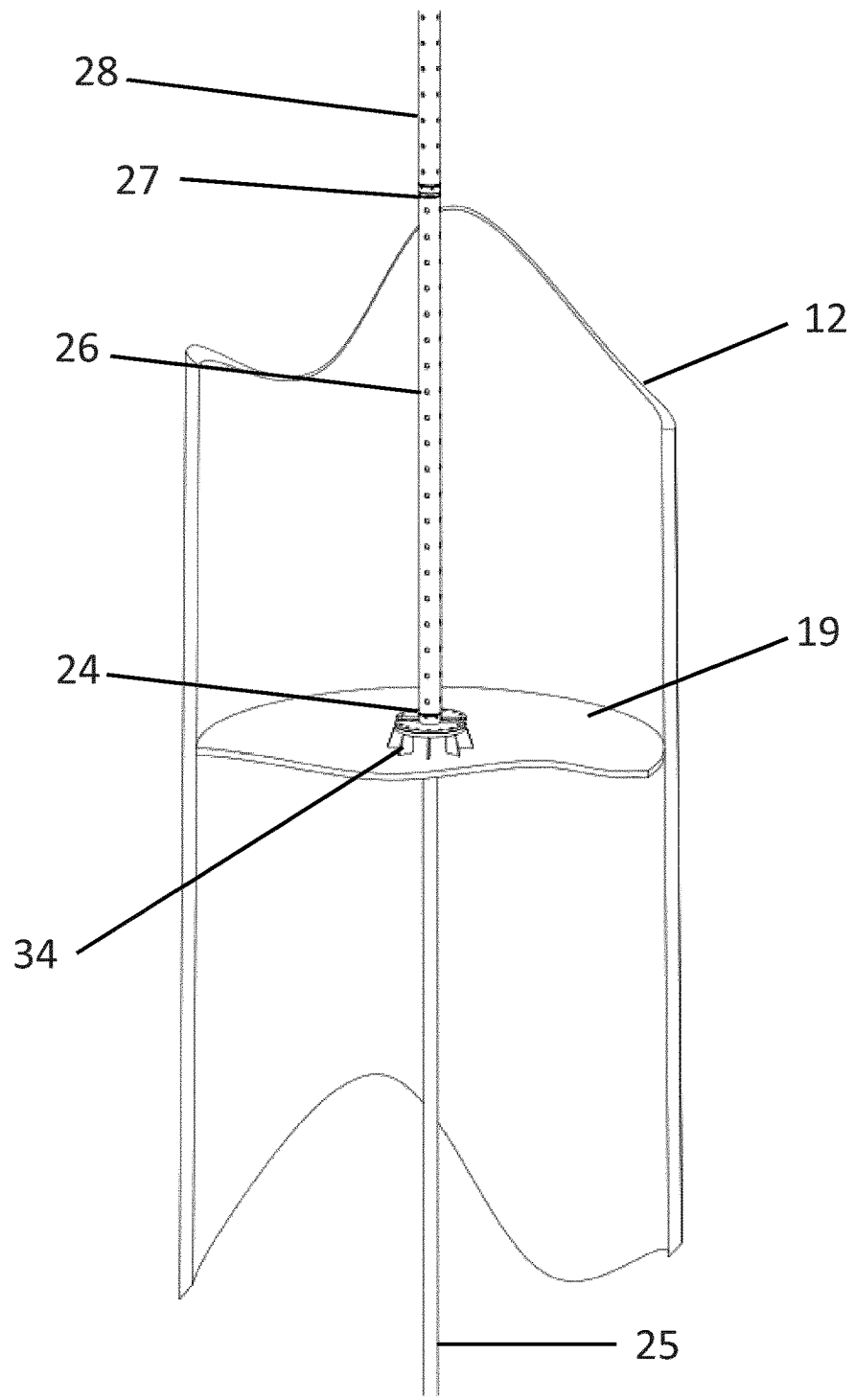
FIG. 5 shows the flexible conduit installed in a monopile foundation, where the forecast length is correct and the flexible conduit is hung off in the main hang-off interface.

FIG. 5 shows the flexible conduit installed in a monopile foundation 12, where the flexible conduit 25 with internal cable is hung off at the hang-off interface 34 on deck 19 by hang-off collar 24. Hang-off collar 24 corresponding to the correct forecast length of the conduit 25. In most cases the hang-off deck 19 is required to be airtight and may be fluid tight in some applications. But there may be cases where the hang-off deck 19 is not required to be airtight.

Figure 6:
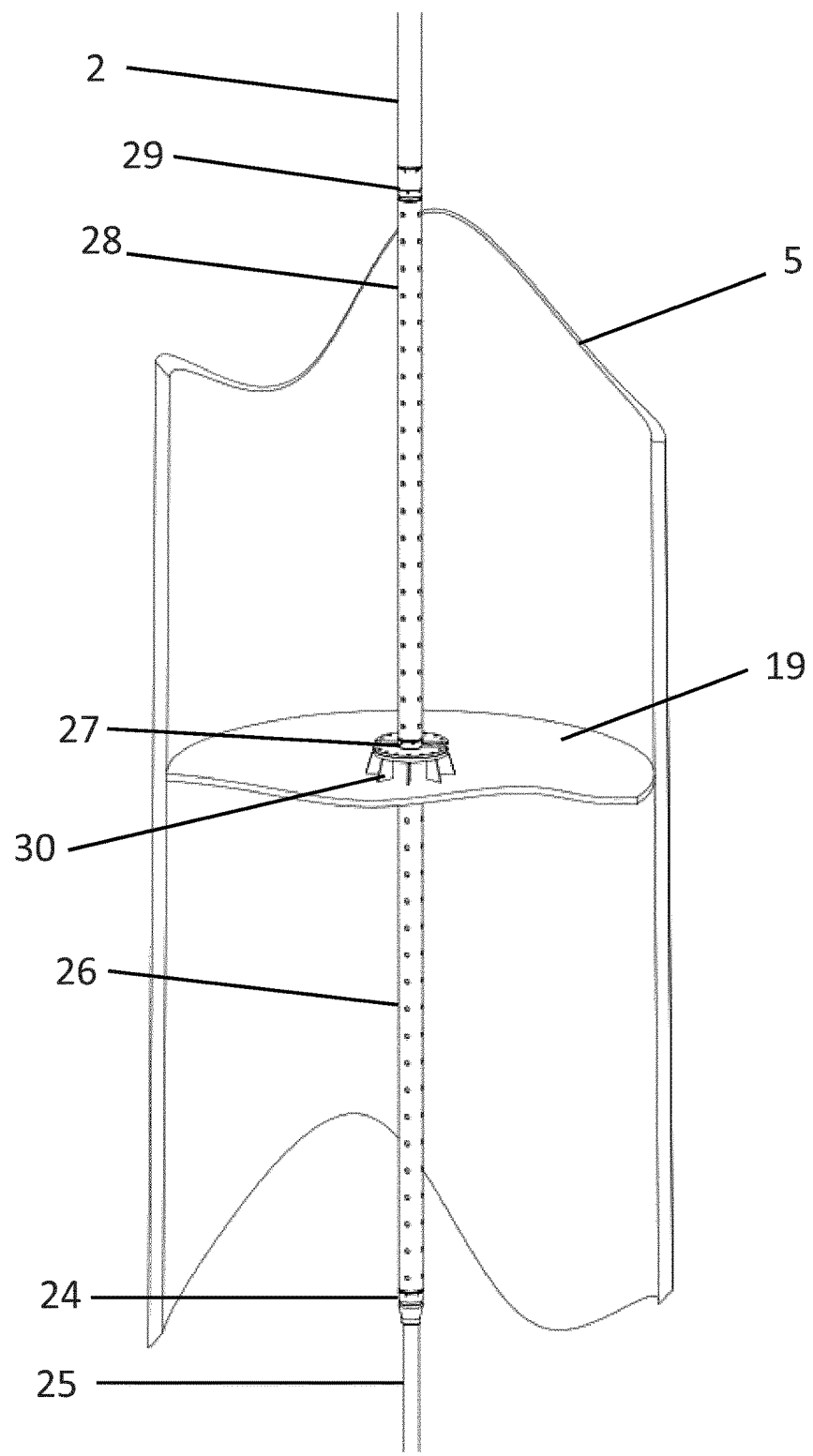
FIG. 6 shows the flexible conduit installed in a monopile foundation, in an embodiment where the forecast length is too short and the cable is hung off in the first hang-off interface.

FIG. 6 shows the flexible conduit installed in a monopile foundation 5, in an embodiment where the forecast length is too short and the conduit 25 is hung off by the first supplemental hang-off collar 27. In this embodiment, the extension segment 26 forms an extension of the conduit 25 below the first supplemental hang-off collar 27, i.e. the extension segment 26 add a pre-determined length to the original forecasted conduit length. The length of the additional segment 26 and the additional segment 28, and any additional number of segments, may be shorter or longer dependent on the demand in the specific project.

Figure 7:
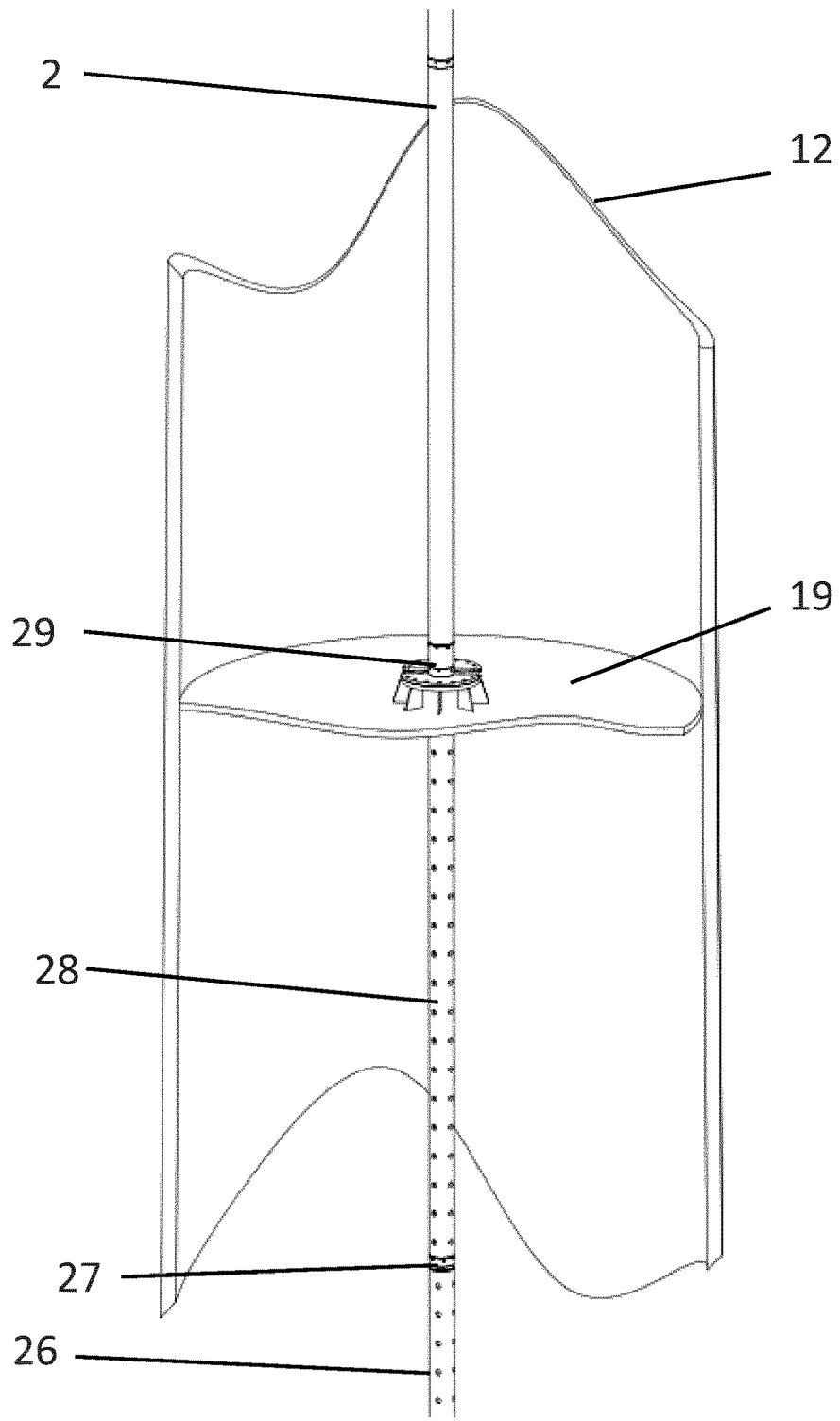
FIG. 7 shows the flexible conduit installed in a monopile foundation, in an embodiment where the forecast length is too short and the cable is hung off in the second hang-off interface.

FIG. 7 shows the flexible conduit installed in a monopile foundation 12, in an embodiment where the forecast length is too short and the conduit 25 is hung off in the second supplemental hang-off collar 29. The other features are similar to the embodiments in FIGS. 5 and 6.

Figure 8:
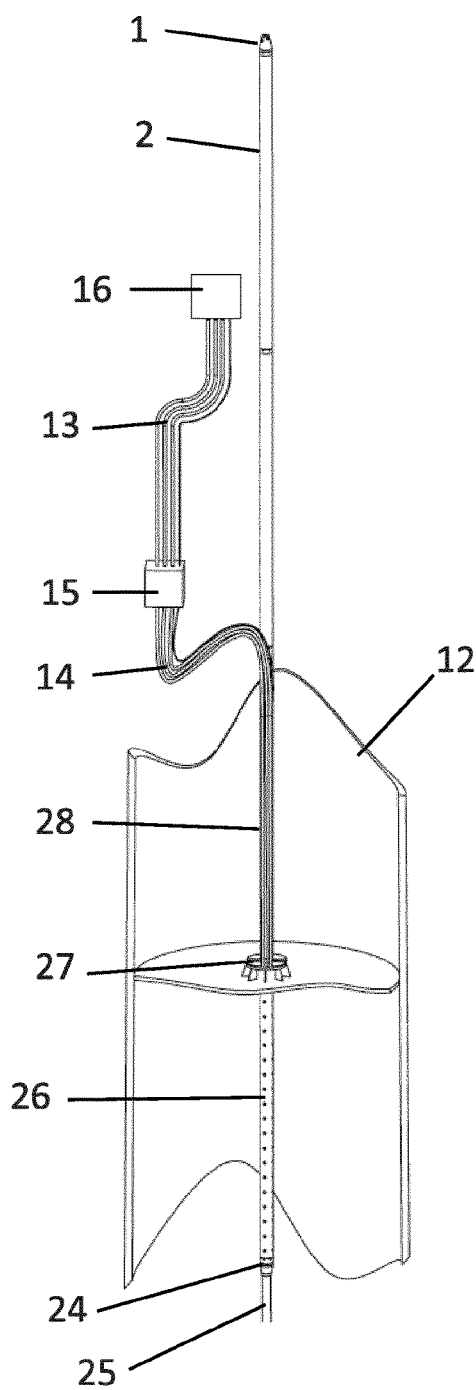
FIGS. 8 and 9 show embodiments of use of J-boxes when the forecast cable length is too short.
Figure 9:
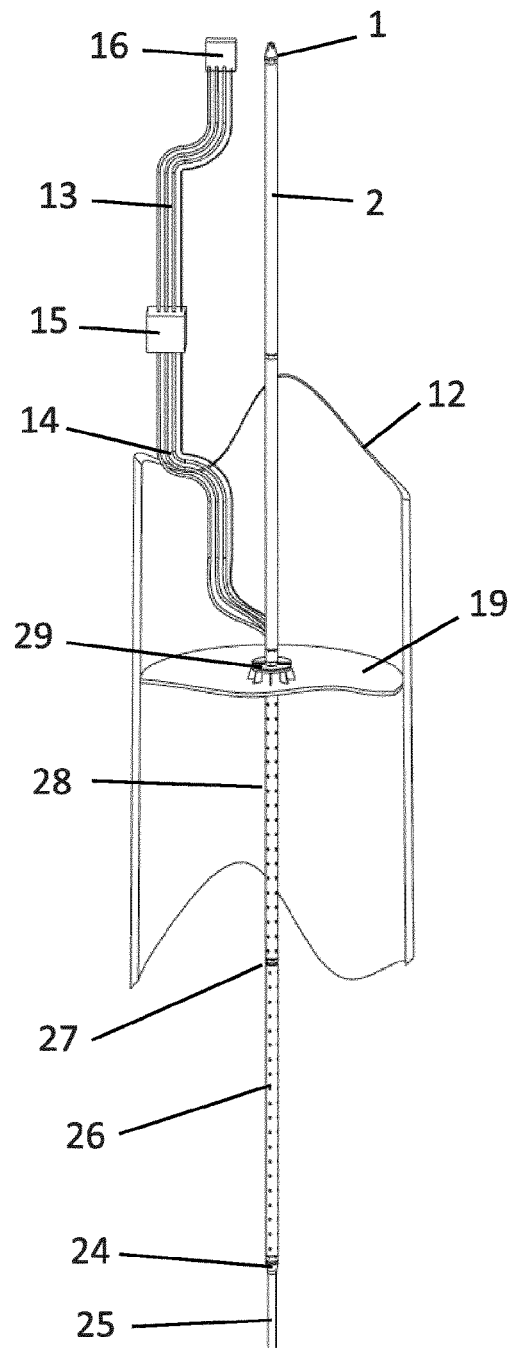

FIGS. 8 and 9 show embodiments of use of J-boxes when the forecast cable length is too short. Then individual jumpers 13, 14 are used to reach between switch-gear 16 and the cable connectors. In the embodiment on FIG. 8, the conduit is hung-off in the first supplemental hang-off collar 27 with the adding of extension segment 26 to the conduit 25 length, and in FIG. 9 the conduit 25 is hung off in the second supplemental hang-off collar 29 with the conduit length added with the combined length of first and second segments 26 and 28. In both embodiments on FIGS. 8 and 9, the segments 26, 27 are opened and the respective cable components connectors are routed to a terminal. This may be by utilizing jumpers 14 leading to a J-box 15, from which J-box 15 the connectors are further guided to switch-gear 16 by jumpers 13.

Figure 10:
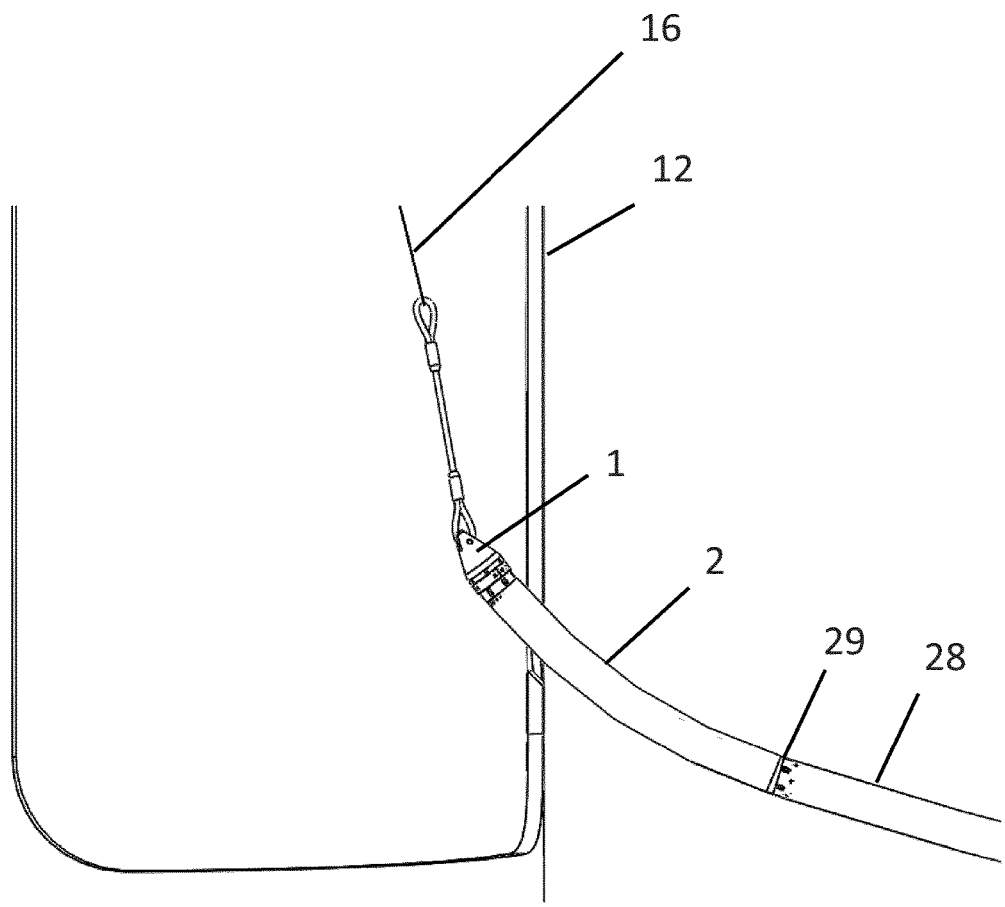
FIG. 10 shows the flexible conduit after entering the monopile foundation 12 by using a wire.

FIG. 10 shows the flexible conduit after entering the monopile foundation 12. The flexible conduit and cable is dragged into position by a wire 16 or other suitable means.

Figure 11:
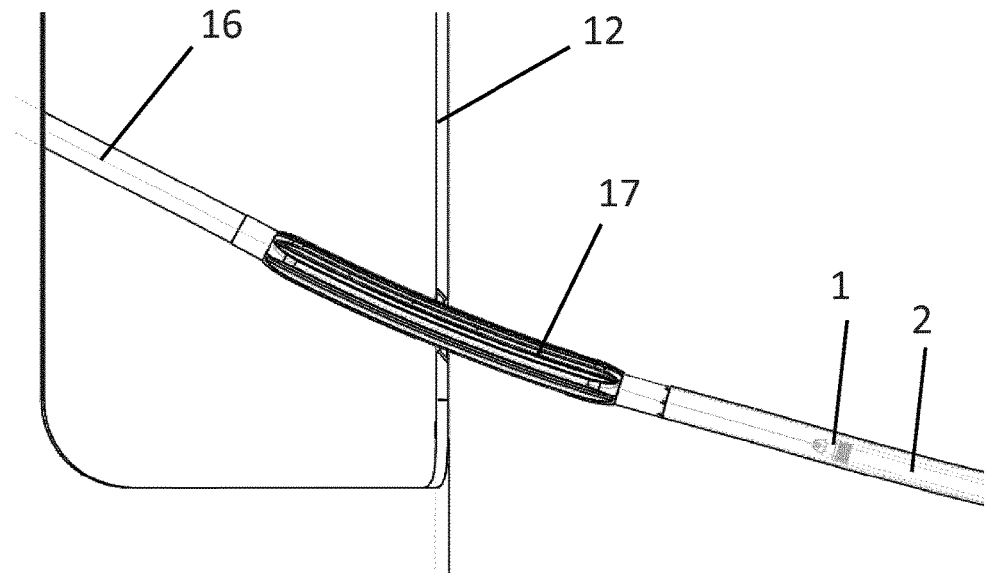
FIGS. 11 and 12 show views of the flexible conduit and cable entering the monopile foundation.
Figure 12:
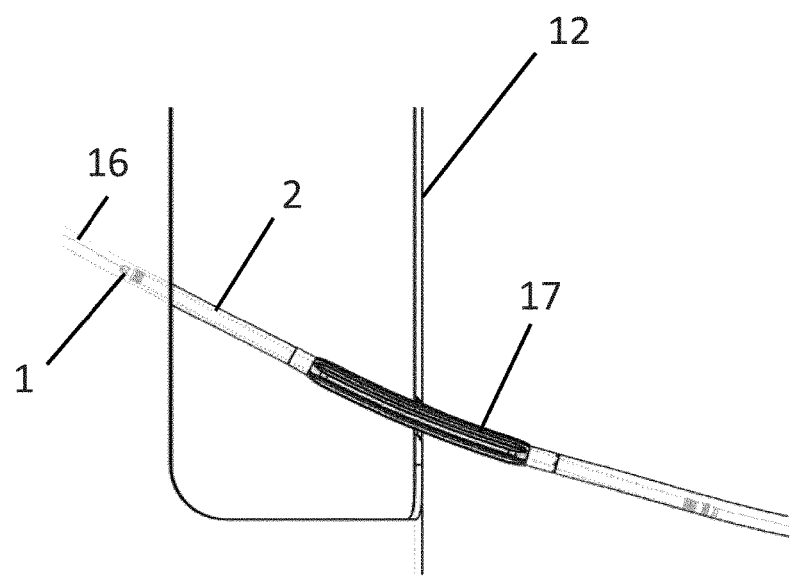

FIGS. 11 and 12 show views of the flexible conduit and cable entering the monopile foundation 12. More specific, a cable protection system 17 is arranged in the interface between the water and the opening in the side of the monopile foundation 12. Conduit 25 is pulled through cable protection system 17, such that the flexible conduit 25 and cable is protected during entrance into the monopile foundation 12.

Figure 13:
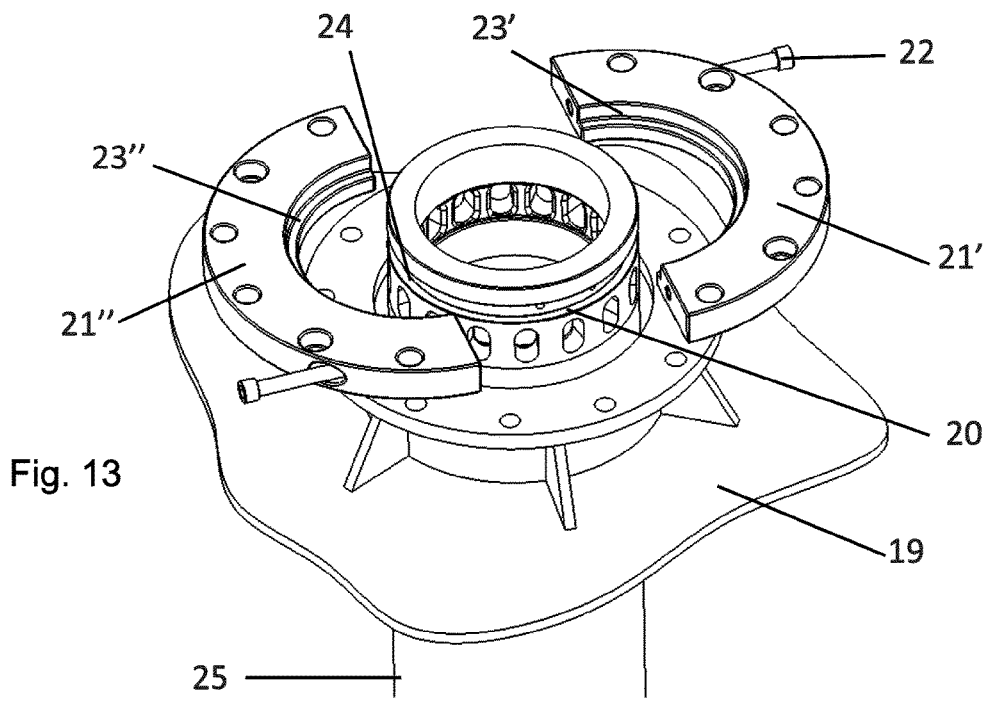
FIGS. 13 and 14 show an embodiment of the hang-off interface formed by two half-circles.
Figure 14:
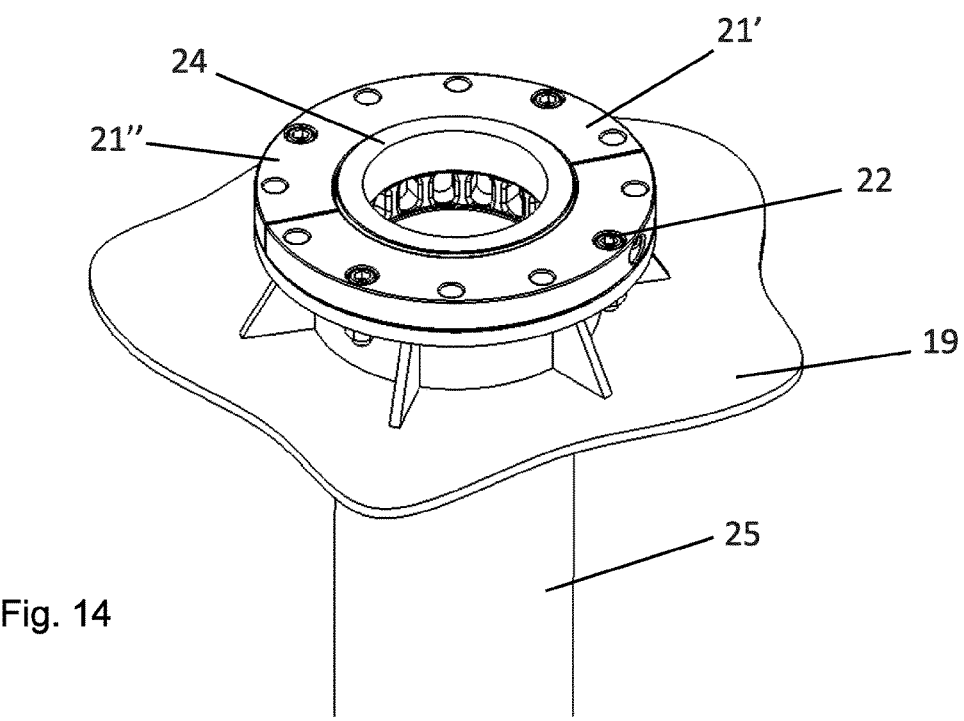

FIGS. 13 and 14 show an example of an embodiment of the hang-off interface formed by two half-circles 21', 21", where FIG. 13 shows the situation during connection of the two half-circles 21', 21" while FIG. 14 shows the situation after the two half-circles 21', 21' have been fixed around the conduit 25. The principle of hang-off interfaces made up of half-circles 21', 21" closing around the cable or flexible conduit, is generally known in the art. The cable or flexible conduit comprises an external groove 20 extending around the whole circular circumference of the cable/flexible conduit. The half-circles 21', 21" have complementary projections 23', 23" on the radial inside, to fit with the groove 20 on the cable/flexible conduit. After arranging the half-circles around the groove, they are fixed in place by e.g. screws 22 or other suitable means known to the person skilled in the art. As can be seen from the drawing, when the half-circles 21', 21" are arranged in the groove 20 of the main hang-off collar 24, they form a flange (see FIG. 14).

The invention presented facilitates an elongation length to be incorporated in the pre-terminated (=pre-determined length) cable thus allowing the cable to be installed—also when the pre-determined cable is found to be to short when the second end is to be pulled in and hung of in its foundation/structure.

In order to allow a certain "margin" of variable cable length below the projected cable length the following invention will allow; the cable length to be fixed in its forecasted length in its pre-determined hang-off position 24. At this cable length the inventions elongated length—made up of the combined length of segments 26 and 28 is not required and hence tower on top of the hang-off interface where the hang-off collar 24 is secured.

The invention claimed is:

1. An offshore cable arrangement, comprising an elongated flexible conduit in which is arranged a cable, said conduit having first and second ends, wherein the first end is equipped with a termination body arranged to be connected to a hang-off interface at a first offshore installation, and wherein the second end of the conduit comprises a first, primary hang-off collar arranged to be connected to a hang-off interface at a second offshore installation, wherein:
   a. the conduit is precut to a predetermined length, whereby a distance between the first end of the conduit and the primary hang-off collar corresponds to a target cable-laying distance between the hang-off interface of the first installation and the hang-off interface of the second installation,
   b. at the second end of the conduit is arranged one or more preinstalled extension segments, each of said extension segments being equipped with a supplemental hang-off collar, and
   c. a preterminated array comprising a nose pull member is arranged at an end of the one or more extension segments.

2. An offshore cable arrangement according to claim 1, wherein airtight and watertight seals are arranged between the extension segments and between the extension segments and the preterminated array.

3. An offshore cable arrangement according to claim 2, wherein the airtight and watertight seals comprise a body having passages through which the cable sealingly engages.

4. An offshore cable arrangement according to claim 1, wherein the conduit is made of a fibre-reinforced polymer.

5. An offshore cable arrangement according to one of the preceding claims, wherein the extension segments are ventilated by a plurality of holes.

6. A method for installing an offshore cable arranged inside a flexible conduit between a first and second installation, wherein the method comprises the steps of:
   a. determining an optimal cable-laying distance between a hang-off interface of the first installation and a hang-off interface of the second installation,
   b. precutting the conduit to a target length corresponding to the optimal cable-laying distance,
   c. arranging a termination body at a first end of the conduit and a primary hang-off collar at a second end of the conduit,
   d. arranging one or more extension segments to the second end of the conduit, said extension segments each having a supplemental hang-off collar,
   e. Arranging a preterminated array with nose pull device at a leading end of the leading most of the extension segments,
   f. Arranging a cable within the conduit,
   g. Attaching the termination body to the hang-off interface at the first installation,
   h. laying the conduit and cable to the second installation,
   i. Pulling the conduit towards the hang-off interface,
   j. In the event the conduit is of sufficient length, connecting the primary hang-off collar to the hang-off interface, and in the event the conduit is of insufficient length, connecting the supplemental hang-off collar to the hang-off interface.

7. A method for installing an offshore cable according to claim 6, wherein the extension segments are ventilated, and airtight seals are arranged between adjacent extension segments.

8. A method for installing an offshore cable according to claim 6 or 7, wherein, in the event the primary hang-off collar is connected to the hang-off interface, the extension segments are arranged to protrude vertically up through the hang-off interface, said interface being arranged in a deck in a foundation of the second installation.

* * * * *